(12) United States Patent  
Couillard et al.

(10) Patent No.: US 11,204,748 B2  
(45) Date of Patent: *Dec. 21, 2021

(54) SECURE MACHINE EXECUTABLE CODE DEPLOYMENT AND EXECUTION METHOD AND SYSTEM

(71) Applicant: CRYPTO4A TECHNOLOGIES INC., Gatineau (CA)

(72) Inventors: Bruno Couillard, Gatineau (CA); Bradley Clare Ritchie, Kemptville (CA); James Ross Goodman, Ottawa (CA); Jean-Pierre Fiset, Ottawa (CA)

(73) Assignee: Crypto4A Technologies Inc., Gatineau (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/875,828

(22) Filed: May 15, 2020

(65) Prior Publication Data

US 2020/0278850 A1 Sep. 3, 2020

Related U.S. Application Data

(63) Continuation of application No. 16/410,273, filed on May 13, 2019, now Pat. No. 10,678,525, which is a (Continued)

(51) Int. Cl.
*G06F 8/60* (2018.01)
*G06F 21/12* (2013.01)
(Continued)

(52) U.S. Cl.
CPC .............. *G06F 8/60* (2013.01); *G06F 21/125* (2013.01); *G06F 21/44* (2013.01); *G06F 21/57* (2013.01);
(Continued)

(58) Field of Classification Search
None
See application file for complete search history.

(56) References Cited

U.S. PATENT DOCUMENTS

| 5,487,170 A | * | 1/1996 | Bass | ............... G06F 9/4881 |
| | | | | 370/461 |
| 6,073,172 A | * | 6/2000 | Frailong | ............ H04L 41/0806 |
| | | | | 709/222 |

(Continued)

FOREIGN PATENT DOCUMENTS

| CA | 2774728 A1 | 5/2011 |
| CA | 2826813 A1 | 8/2012 |

(Continued)

OTHER PUBLICATIONS

Guiffrida, "Enhanced Operating System Security Through Efficient and Fine-grained Address Space Randomization", 2012, USENIX Security Symposium, 2012 (Year: 2012).*

(Continued)

*Primary Examiner* — Hossain M Morshed
(74) *Attorney, Agent, or Firm* — Knobbe, Martens, Olson & Bear, LLP

(57) ABSTRACT

Described are various embodiments of a machine executable code deployment method and system. In one such embodiment, a machine executable code deployment method is described to comprise: compiling machine readable code in a secure digital processing environment to produce a unique ephemeral machine executable code instance representative thereof; deploying the unique ephemeral machine executable code instance to a distinct digital processing environment to be executed thereon for a predetermined runtime period, wherein execution of the unique ephemeral machine executable code instance is automatically terminated after the predetermined runtime period; and repeating the deploy- (Continued)

ing for subsequent unique ephemeral machine executable code instances.

24 Claims, 8 Drawing Sheets

Related U.S. Application Data continuation of application No. PCT/CA2018/050927, filed on Jul. 30, 2018.

(60) Provisional application No. 62/542,428, filed on Aug. 8, 2017.

(51) Int. Cl.
| | |
|---|---|
| *G06F 21/44* | (2013.01) |
| *G06F 21/57* | (2013.01) |
| *H04L 9/08* | (2006.01) |
| *H04L 29/06* | (2006.01) |
| *G06F 8/41* | (2018.01) |

(52) U.S. Cl.
CPC .......... *H04L 9/088* (2013.01); *H04L 63/0272* (2013.01); *G06F 8/41* (2013.01); *G06F 2221/0748* (2013.01); *G06F 2221/2149* (2013.01); *H04L 2209/16* (2013.01)

(56) References Cited

U.S. PATENT DOCUMENTS

| | | | |
|---|---|---|---|
| 6,678,824 B1 | 1/2004 | Cannon et al. | |
| 6,918,038 B1* | 7/2005 | Smith | G06F 8/65 |
| | | | 709/223 |
| 7,769,165 B2 | 8/2010 | Jakubowski et al. | |
| 8,031,521 B1* | 10/2011 | Yang | G11C 16/06 |
| | | | 365/185.02 |
| 8,225,077 B2 | 7/2012 | Sato et al. | |
| 8,245,218 B2* | 8/2012 | Giambalvo | G06F 8/65 |
| | | | 717/172 |
| 8,510,726 B2* | 8/2013 | Eisen | H04L 9/002 |
| | | | 717/162 |
| 8,549,656 B2 | 10/2013 | Blaisdell | |
| 8,712,037 B2 | 4/2014 | Lee et al. | |
| 8,712,041 B2* | 4/2014 | Lee | H04L 9/0618 |
| | | | 380/44 |
| 8,769,305 B2 | 7/2014 | Blaisdell | |
| 8,812,868 B2 | 8/2014 | Blaisdell | |
| 8,893,298 B2 | 11/2014 | Roark | |
| 8,955,142 B2 | 2/2015 | Blaisdell | |
| 8,990,920 B2 | 3/2015 | Pontillo | |
| 9,135,434 B2* | 9/2015 | Nagpal | G06F 21/51 |
| 9,141,384 B2 | 9/2015 | Xiao | |
| 9,141,787 B2 | 9/2015 | Gu et al. | |
| 9,208,081 B1* | 12/2015 | Dice | G06F 12/0269 |
| 9,213,826 B2 | 12/2015 | Gu | |
| 9,306,933 B2 | 4/2016 | Pontillo | |
| 9,396,325 B2 | 7/2016 | Kendall | |
| 9,537,896 B2 | 1/2017 | Wallis | |
| 9,542,552 B2 | 1/2017 | Peterson | |
| 10,002,247 B2 | 6/2018 | Suarez | |
| 10,032,032 B2 | 7/2018 | Suarez | |
| 10,678,525 B2* | 6/2020 | Couillard | G06F 21/44 |
| 2004/0083373 A1* | 4/2004 | Perkins | H04L 9/3236 |
| | | | 713/189 |
| 2005/0050355 A1* | 3/2005 | Graunke | H04L 9/06 |
| | | | 726/4 |
| 2005/0192099 A1* | 9/2005 | Nguyen | H04L 63/0435 |
| | | | 463/42 |
| 2006/0129459 A1* | 6/2006 | Mendelsohn | G06F 21/10 |
| | | | 705/26.81 |
| 2006/0143350 A1* | 6/2006 | Miloushev | G06F 9/5016 |
| | | | 710/242 |
| 2009/0113402 A1* | 4/2009 | Chen | G06F 8/41 |
| | | | 717/140 |
| 2009/0249492 A1 | 10/2009 | Sorensen | |
| 2012/0210443 A1 | 8/2012 | Blaisdell et al. | |
| 2012/0246484 A1 | 9/2012 | Blaisdell | |
| 2012/0246487 A1 | 9/2012 | Gu et al. | |
| 2012/0246731 A1 | 9/2012 | Blaisdell | |
| 2012/0304310 A1 | 11/2012 | Blaisdell | |
| 2013/0031159 A1 | 1/2013 | Xiao et al. | |
| 2013/0125090 A1 | 5/2013 | Durand et al. | |
| 2013/0205415 A1 | 8/2013 | McKee et al. | |
| 2013/0247147 A1 | 9/2013 | Pontillo et al. | |
| 2013/0291086 A1 | 10/2013 | Pontillo et al. | |
| 2014/0040622 A1 | 2/2014 | Kendall et al. | |
| 2014/0208100 A1 | 7/2014 | Kendall | |
| 2014/0208397 A1 | 7/2014 | Peterson | |
| 2014/0298354 A1* | 10/2014 | Higano | G06F 11/0766 |
| | | | 719/313 |
| 2015/0007259 A1 | 1/2015 | Peterson | |
| 2015/0215117 A1 | 7/2015 | Kim et al. | |
| 2015/0324302 A1 | 11/2015 | Lee et al. | |
| 2016/0132317 A1* | 5/2016 | Mitchell | H04W 4/60 |
| | | | 717/170 |
| 2016/0142413 A1* | 5/2016 | Diep | G06F 21/51 |
| | | | 726/4 |
| 2016/0205074 A1 | 7/2016 | Mitchell | |
| 2016/0246656 A1* | 8/2016 | Kobayashi | G06F 9/542 |
| 2017/0116410 A1* | 4/2017 | Wajs | G06F 8/70 |
| 2017/0177860 A1 | 6/2017 | Suarez et al. | |
| 2017/0177877 A1 | 6/2017 | Suarez et al. | |
| 2017/0180346 A1 | 6/2017 | Suarez et al. | |

FOREIGN PATENT DOCUMENTS

| | | | |
|---|---|---|---|
| CA | 2830493 A1 | 9/2012 | |
| EP | 2940677 A1 | 11/2015 | |
| WO | 2016062609 A1 | 4/2016 | |
| WO | 2017106726 A1 | 6/2017 | |
| WO | WO-2017106726 A1 * | 6/2017 | ............. G06F 21/44 |

OTHER PUBLICATIONS

Schneider, "Schneier on Security", 2014, https://www.schneier.com/blog/archives/2014/04/ephemeral_apps.html (Year: 2014).*
Giuffrida, "Enhanced Operating System Security Through Efficient and Fine-grained Address Space Randomization", 2012, usenix (Year: 2012).*
Hohl, "Time Limited Blackbox Security: Protecting Mobile Agents From Malicious Hosts", 1998, SpringerLink (Year: 1998).*
Behera C.K. and Bhaskari D.L., Different Obfuscation Techniques for Code Protection, Procedia Computer Science 70 (2015) 757-763.
CloakWare Software Protection, Product Datasheet, Irdeto, Last modification: Mar. 8, 2017.
Code Virtualizer, Oreans Technology, https://oreans.com/codevirtualizer.php, retrieved Aug. 22, 2017.
International Search Report for PCT/CA2018/050927, dated Nov. 8, 2018.
Joye M., On White-Box Cryptography, International Conference on Security of Information and Networks, Trafford Publishing, 2008, pp. 7-12.
Klinec D. and Svenda P., White-box attack resistant cryptography: Hiding cryptographic keys against the powerful attacker, Centre for Research on Cryptography and Security, https://crocs.fi.muni.cz/_media/public/crocs/whiteboxcrypto_20130531.pdf (May 31, 2013).
Mehlberg M., Securing Cryptographic Assets for the Internet of Things, Electronic Engineering Times Europe, Jul./Aug. 2014, pp. 36-37.
Muir J.A., A Tutorial on White-box AES, Irdeto Canada, Feb. 22, 2013 (extended and corrected version of a paper that initially appeared in Advances in Network Analysis and its Applications, Mathematics in Industry 18 (2013), 209-229).
Mune C., Sanfelix E., De Haas J., Unboxing the White-Box, Riscure, https://www.riscure.com/documents/eu-15-sanfelix-mune-dehaas-unboxing-the-white-box.pdf?1447748575, retrieved Aug. 22, 2017, pp. 1-56.

(56) References Cited

OTHER PUBLICATIONS

Popa M., Techniques of Program Code Obfuscation for Secure Software, Journal of Mobile, Embedded and Distributed Systems, vol. III, No. 4, 2011, pp. 205-219.
Schultz R., The Many Facades of DRM, MISC HS 5 magazine, pp. 58-64, Apr. 2012.
Sentinel(R) HL Hardware Hardware Protection. Refined., Family Brochure, Gemalto, v.7, Oct. 6, 2015, pp. 1-15.
Software and games protection, StarForce, http://www.star-force.com/solutions/software-protection/, retrieved Aug. 22, 2017.
Thermida, Oreans Technology, https://oreans.com/thermida.php, retrieved Aug. 22, 2017.
Understanding White-Box Cryptography, White Paper, v.3, Gemalto, Jul. 20, 2016, pp. 1-4.
VMProtect Software Protection, http://vmpsoft.com/products/vmprotect/, retrieved Aug. 22, 2017.
White Box Cryptography, https://sentinel.gemalto.com/software-monetization/white-box-cryptography/, retrieved Aug. 22, 2017.
WhiteCryption, Intertrust Technologies, https://www.intertrust.com/products/application-shielding/, retrieved Aug. 22, 2017.
Wyseur B. ,PhD graduation presentation,University of Leuven, Mar. 5, 2009, pp. 1-9.
Wyseur B., Applying White-Box Cryptography, SoBeNet user group meeting, Oct. 8, 2004.
Wyseur B., White-Box Cryptography, PhD Dissertation, University of Leuven, Leuven-Heverlee, Mar. 2009, 167 pages.
Wyseur B., White-box Cryptography: hiding keys in software, MISC magazine, Apr. 2012.
Crane, "Readactor: Practical Code Randomization Resilient to Memory Disclosure", 2015, IEEE Symposium on Security and Disclosure (Year: 2015).
Giuffrida, "Enhanced Operating System Security Through Efficient and Fine-grained Address Space Randomization", 2012, USENIX Security Symposium (Year 2012).
Microsoft, "Security and privacy for OS deployment in Configuration Manager" 2016, https://docs.microsoft.com/en-us/scom/osd/plan-design/security-and-privacy-for-operating-system-deployment (Year 2016).
Spec Int, "Top 10 Most Secure Operating Systems", 2019, https://www.secpoint.com/top-10-most-secure-operating-systems.html (Year 2019).
Techopedia, "Compile", 2019, https://www.techopedia.com/definition/540/compile (Year: 2019).
Hohl, "Time Limited Blackbox security: Protecting Mobile Agents From Malicious Hosts", Institute of Parallel And Distributed High-Performance Systems (IPVR), University of Stuttgart, Germany. 22 pages.
Sarmenta, "Volunteer Computing", Department of Electrical Engineering and Computer Science in partial fulfillment of the requirements for the degree of Doctor of Philosophy at the Massachusetts Institute of Technology, Jun. 2001. 42 pages.
Extended European Search Report dated Mar. 24, 2021 for European Patent Application No. 18842909.6. 9 pages.

* cited by examiner

SECURE MACHINE EXECUTABLE CODE DEPLOYMENT AND EXECUTION METHOD AND SYSTEM

CROSS REFERENCE TO RELATED APPLICATIONS

This application is a continuation application of U.S. patent application Ser. No. 16/410,273, filed May 13, 2019, which is a continuation application of International Application No. PCT/CA2018/050927, filed Jul. 30, 2018, which claims priority to U.S. Provisional Patent Application No. 62/542,428, filed Aug. 8, 2017, the entire disclosure of each of which is hereby incorporated by reference.

FIELD OF THE DISCLOSURE

The present disclosure relates to machine executable code distribution systems, and, in particular, to a secure machine executable code deployment and execution method and system.

BACKGROUND

Computer executable programs and applications are routinely deployed for execution or implementation on network-accessible systems and devices, which may be subject to undesirable third-party attacks if not adequately protected in their runtime environment. For instance, attackers can at times successfully gain sufficient control of the applications runtime environment to examine the application's inputs/outputs, and with the help of a disassembler and/or debugger, look at the result of some if not all intermediate computations carried out by the application. Security protocol/service applications and/or servers subject to such attacks may not only expose themselves and their related data to compromise, but also expose other clients/servers relying thereon for security measures.

In such an open "white-box" environment (vs. a closed "black-box" environment), the attacker is assumed to be able to conduct a "white-box attack", meaning that they may ultimately be able to modify the data being operated on, the memory contents and the execution flow of the application. The term "white-box cryptography" (WBC) generally describes a secure implementation of a cryptographic algorithm in an execution environment, such as on a desktop computer or a mobile device, which is fully observable and modifiable by an attacker. Accordingly, WBC aims at protecting cryptographic keys from being disclosed in an application operating within such a white-box environment. To do so, the cryptographic algorithm is intermixed with an encryption key with the intent that the key is never revealed in memory even when runtime cryptographic computations are being observed in complete detail by an attacker. Such techniques are often used in the context of Digital Rights Management (DRM), for example.

In the case of software applications, these techniques are usually combined with more general code obfuscation methods that alter a software application (e.g. altering an executable binary) in various ways to create multiple instances of the application that, while providing the same and/or similar functionality, to an attacker appear different and/or operate differently (e.g. operate differently at a binary level). The goal of these methods is to frustrate the attacker's attempts to exploit information gained from one deployment of an application to compromise other deployments. These whitebox and code obfuscation techniques usually introduce some randomness when generating the final binary executable, so that every instance generated from the same source code, while functionally equivalent, has a unique binary representation.

Different white-box cryptography related solutions are described, for example, in U.S. Pat. Nos. 8,510,726 and 8,712,041. Different white-box cryptography products are also currently available on the market, such as Intertrust's whiteCryption Secure Key Box API (https://www.intertrust-.com/products/application-security), Gemalto's Sentinel portfolio of licensing solutions (https://sentinel.gemalto-.com/software-monetization/white-box-cryptography) or the Cloakware family of products by Irdeto (https://blog.irdeto.com/tag/white-box-cryptography/).

Virtualization technology may also integrate similar techniques and methods. Virtualization solutions that offer protection against reverse engineering include products like VMProtect (http://vmpsoft.com/products/vmprotect) or Oreans Technologies' products like Code Virtualizer (https://oreans.com/codevirtualizer.php) or Themida (https://www.oreans.com/themida.php). A number of gaming software applications also use the StarForce virtualization system (http://www.star-force.com/solutions/software-protection/) for copy protection and anti-reverse engineering.

Another example of White-box cryptography, used here in the context of software distribution, is described in U.S. Patent Application Publication No. 2017/0116410, which describes a method of providing a protected item of software to a device, wherein the protected item of software is in a scripted, interpreted language or source code. The protected item of software, when executed by the device, is arranged to perform security-related operations, wherein at least one protected portion of the code has resistance against a whitebox attack and/or may only be executed on one or more predetermined devices.

In the same context, U.S. Patent Application Publication No. 2016/0132317 describes systems and methods to facilitate secure application distribution through deployment of a diversity of application instances in an application distribution channel. The software diversification methods (including white-box cryptography and obfuscation techniques) are designed to mitigate large-scale automated circumvention of security protections by presenting attacking malware moving and/or otherwise unpredictably diverse targets.

This background information is provided to reveal information believed by the applicant to be of possible relevance. No admission is necessarily intended, nor should be construed, that any of the preceding information constitutes prior art or forms part of the general common knowledge in the relevant art.

SUMMARY

The following presents a simplified summary of the general inventive concept(s) described herein to provide a basic understanding of some aspects of the disclosure. This summary is not an extensive overview of the disclosure. It is not intended to restrict key or critical elements of embodiments of the disclosure or to delineate their scope beyond that which is explicitly or implicitly described by the following description and claims.

A need exists for a secure machine executable code deployment and execution method and system that overcome some of the drawbacks of known techniques, or at least, provides a useful alternative thereto. Some aspects of this disclosure provide examples of such systems and methods.

In accordance with one aspect, there is provided a machine executable code deployment method comprising: compiling machine readable code in a secure digital processing environment to produce a unique ephemeral machine executable code instance representative thereof; deploying the unique ephemeral machine executable code instance to a distinct digital processing environment to be executed thereon for a predetermined runtime period, wherein execution of the unique ephemeral machine executable code instance is automatically terminated after the predetermined runtime period; and repeating the deploying for subsequent unique ephemeral machine executable code instances.

In one embodiment, the method further comprises digitally authenticating the distinct digital processing environment and authorizing execution of the machine executable code instance solely upon successful authentication of the distinct digital processing environment.

In one embodiment, digitally authenticating occurs after the deploying.

In one embodiment, the digitally authenticating comprises accessing and authenticating hardware and/or network characteristics associated with the distinct digital processing environment.

In one embodiment, the method further comprises, after the deploying, establishing a designated activation time window and authorizing execution of the unique machine executable code instance in the distinct digital processing environment solely upon receiving an activation request therefrom within the designated activation time window.

In one embodiment, the activation request is securely channeled using a cryptographic key embedded within the machine executable code instance.

In one embodiment, compiling comprises cryptographically compiling the unique machine executable code instance.

In one embodiment, cryptographically compiling comprises embedding cryptographic data within the unique machine executable code instance.

In one embodiment, the cryptographic data comprises a cryptographic key.

In one embodiment, cryptographically compiling comprises a white box encryption process.

In one embodiment, the machine executable code instance is executable to implement a secure network-interfacing process during the predetermined runtime period.

In one embodiment, the secure network-interfacing process comprises establishing a re-establishable secure client network session during the predetermined runtime period.

In one embodiment, the re-establishable secure client network session comprises a virtual private network (VPN) session.

In one embodiment, the secure network-interfacing process is serially transferred from one instance to the next in providing an operatively seamless implementation of the process.

In one embodiment, the secure network-interfacing process comprises a cryptographic process.

In one embodiment, the method further comprises, before said deploying, adding to said unique machine executable code instance a digital signature to be verified by said distinct digital processing environment prior to said execution.

In accordance with another aspect, there is provided a system for deploying machine executable code to an external digital processing environment, the system comprising: a secure network interface to establish a secure network connection to the external digital processing environment; a secure internal digital processing environment comprising: a digital hardware processor; a computer-readable memory having a source code securely stored thereon; a compiler operable by the digital hardware processor in the secure digital processing environment to compile a given unique ephemeral machine executable code instance representative of the source code; and a deployment engine operable to serially deploy each the given unique ephemeral machine executable code instance via the secure network interface to the external digital processing environment to be executed thereon for a predetermined runtime period, wherein execution of each of the given unique ephemeral machine executable code instance is automatically terminated after the predetermined runtime period to be operatively replaced by a subsequent unique ephemeral machine executable code instance.

In one embodiment, the system establishes a secure deployment session via the secure network interface with the external digital processing environment to activate each the given unique machine executable code instance.

In one embodiment, the secure deployment session is established, at least in part, via a unique deployment key embedded by the system within each the given unique ephemeral machine executable code instance.

In one embodiment, the unique deployment key is embedded via a white-box encryption process.

In one embodiment, the secure deployment session is defined by a designated activation time window in which to complete a machine executable code instance activation process between the system and the external digital processing environment if execution of the given unique machine executable code instance is to be authorized.

In one embodiment, the system digitally authenticates the external digital processing environment via the network interface in order to authorize execution of the given unique machine executable code instance.

In one embodiment, the given unique machine executable code instance is uniquely obfuscated.

In one embodiment, the given unique machine executable code instance is executable to implement a secure network-interfacing process during the predetermined runtime period.

In one embodiment, the secure network-interfacing process comprises establishing a re-establishable secure external client network connection session during the predetermined runtime period.

In one embodiment, the re-establishable secure external client network connection comprises a virtual private network (VPN) session.

In one embodiment, the secure network-interfacing process comprises a cryptographic process.

In one embodiment, the cryptographic process comprises a short-term virtual cryptographic machine process.

In one embodiment, the re-establishable secure external client network connection session comprises establishing a Transport Layer Security (TLS) or a Secure Socket Layer (SSL) protocol for the session.

In one embodiment, each given unique machine executable code instance is executable to implement an ephemeral virtual server engine to establish the re-establishable secure external client network connection session.

In one embodiment, the ephemeral virtual server engine defines a virtualized TLS or SSL server.

In one embodiment, the external digital processing environment comprises a network-accessible server operable to execute each the given unique machine executable code instance to implement a secure client network application.

In one embodiment, the system comprises the external digital processing environment.

In one embodiment, the system is a cloud-based system comprising a plurality of distributed digital processing environments, wherein the external digital processing environment is defined by one of the distributed processing environments.

In one embodiment, each said given unique machine executable code instance is digitally signed.

In accordance with another aspect, there is provided a secure cloud-based system comprising: a distribution of digital network processing resources; and a central digital processing environment comprising: a secure network interface to each of the digital processing resources; a digital hardware processor; and a deployment engine operable to serially deploy a unique ephemeral machine executable code instance, via the secure network interface, to a given one of the digital processing resources to be executed thereon for a predetermined runtime period, wherein execution of each the unique ephemeral machine executable code instance is automatically terminated after the predetermined runtime period to be operatively replaced by a subsequent unique ephemeral machine executable code instance.

In one embodiment, the central digital processing environment further comprises: a computer-readable memory having a source code securely stored thereon; and a compiler operable by the digital hardware processor in the central digital processing environment to compile each the unique ephemeral machine executable code instance representative of the source code.

In one embodiment, the central digital processing environment further comprises a network interface to a stockpile of each the unique ephemeral machine executable code instance to be accessed therefrom for deployment.

In one embodiment, the subsequent unique ephemeral machine executable code instance is deployed to a distinct one of the digital processing resources.

In one embodiment, the subsequent unique ephemeral machine executable code instance is deployed to a same one of the digital processing resources.

In one embodiment, the given unique ephemeral machine executable code instance is executable to implement an ephemeral virtual server.

In one embodiment, the given unique ephemeral machine executable code instance is digitally signed with a digital signature to be verified by one of said digital processing resources prior to said execution.

In accordance with another aspect, there is provided a secure deployment system for deploying a runtime application to a distinct runtime environment, the system comprising: a secure network interface to the runtime environment; a digital hardware processor; and a deployment engine operable to serially deploy a unique ephemeral machine executable code instance corresponding with the runtime application via the secure network interface to the runtime environment to be executed thereon for a predetermined runtime period, wherein execution of each the unique ephemeral machine executable code instance is automatically terminated after the predetermined runtime period to be operatively replaced by a subsequent unique ephemeral machine executable code instance.

Other aspects, features and/or advantages will become more apparent upon reading of the following non-restrictive description of specific embodiments thereof, given by way of example only with reference to the accompanying drawings.

BRIEF DESCRIPTION OF THE FIGURES

Several embodiments of the present disclosure will be provided, by way of examples only, with reference to the appended drawings, wherein.

Figure 1:
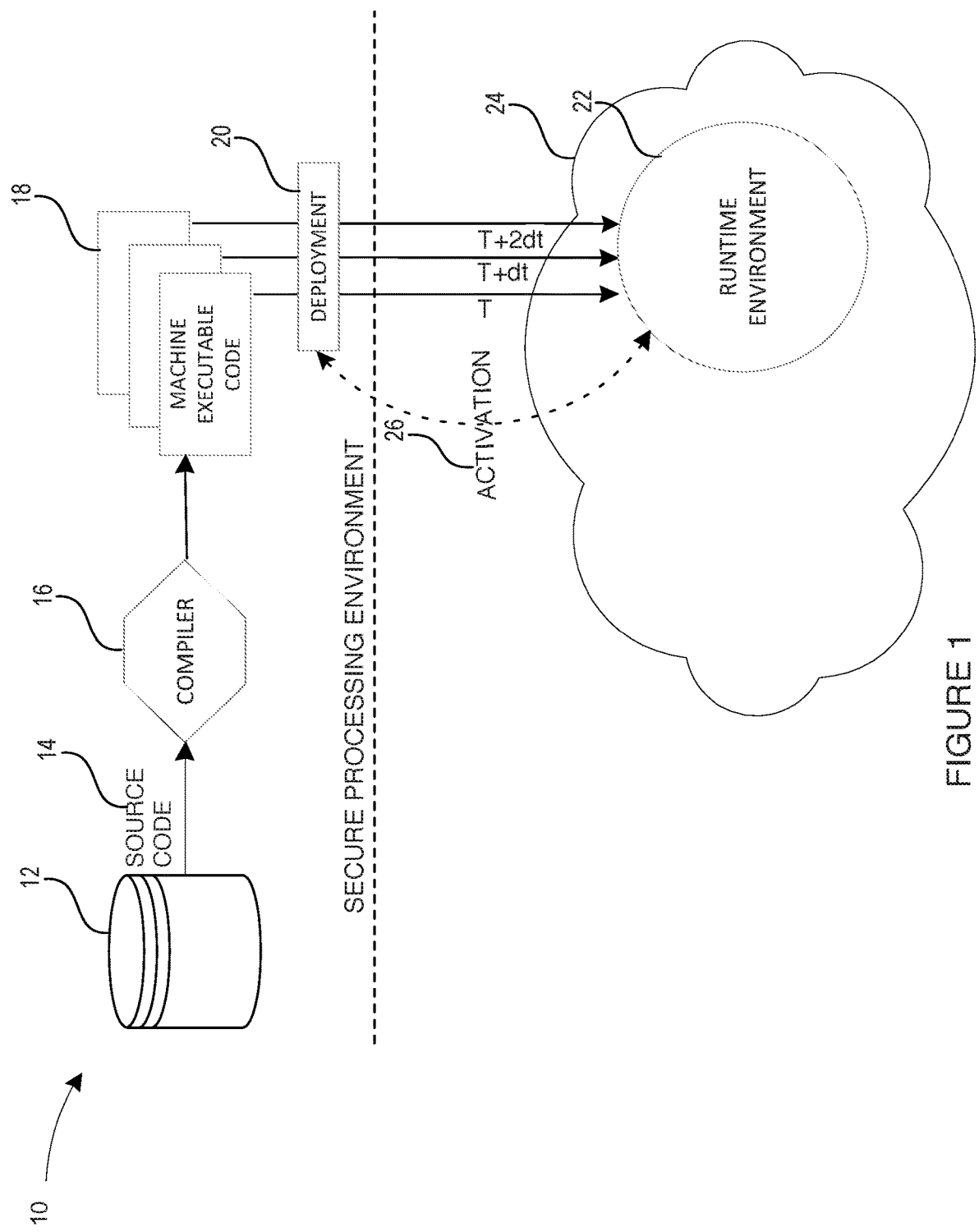
FIG. 1 is a schematic diagram of a secure machine executable code deployment system, in accordance with one embodiment.

Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood elements that are useful or necessary in commercially feasible embodiments are often not depicted in order to facilitate a less obstructed view of these various embodiments of the present disclosure.

DETAILED DESCRIPTION

Various implementations and aspects of the specification will be described with reference to details discussed below. The following description and drawings are illustrative of the specification and are not to be construed as limiting the specification. Numerous specific details are described to provide a thorough understanding of various implementations of the present specification. However, in certain instances, well-known or conventional details are not described in order to provide a concise discussion of implementations of the present specification.

Various apparatuses and processes will be described below to provide examples of implementations of the system disclosed herein. No implementation described below limits any claimed implementation and any claimed implementations may cover processes or apparatuses that differ from those described below. The claimed implementations are not limited to apparatuses or processes having all of the features of any one apparatus or process described below or to features common to multiple or all of the apparatuses or processes described below. It is possible that an apparatus or process described below is not an implementation of any claimed subject matter.

Furthermore, numerous specific details are set forth in order to provide a thorough understanding of the implementations described herein. However, it will be understood by those skilled in the relevant arts that the implementations described herein may be practiced without these specific details. In other instances, well-known methods, procedures and components have not been described in detail so as not to obscure the implementations described herein.

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

The systems and methods described herein provide, in accordance with different embodiments, different examples in which a computer readable code (e.g. source code) can be compiled, assembled and/or stored in a secure digital processing environment so to preserve the integrity and security of the source code, and so to produce computer executable code in that secure environment that can then be deployed for execution or implementation on a distinct (e.g. remote or distributed) digital processing environment. In some embodiments, the computer executable code is compiled as a unique ephemeral instance of the computer executable code that is deployed to be executable for a designated runtime period, to be serially replaced with subsequent instances of the computer executable code thereby limiting exposure of any given instance to potential third-party attacks.

In some embodiments, each instance may be further protected by one or more of code obfuscation (e.g. via code obfuscation techniques uniquely applied to the source code before and/or during compilation), white box cryptography (e.g. implemented before and to be leveraged during deployment), runtime environment verification and/or authentication before and/or during deployment (e.g. to verify the security, legitimacy and/or integrity of the runtime environment), or other deployment security protocols as will be described in greater detail below.

For instance, the systems and methods described herein can provide, in accordance with different embodiments, different examples in which a series of computational systems can be operatively linked to build and deploy short lived, ephemeral, white-box protected application instances (e.g. security applications, such as virtualized security modules, cryptographic engines, virtual private network applications, virtualized secure (TLS, SSL) server applications, or the like) to remote digital processing environments, where each instance is serially replaced with subsequent instances to detract persistent attempts to reverse engineer and attack any particular instance. Each deployed instance may be further protected by implementing a secure deployment authority that must first authenticate the deployment before the instance can be executed, for instance, by requiring the instance to communicate its embedded WBC key back to the deployment authority before execution (e.g. within a limited call back deployment window), implementing further runtime environment verification and/or authentication procedures (e.g. during an initial secure deployment exchange and/or session), and/or only delivering sensitive runtime data to the instance once the instance's secure deployment has been adequately verified or authenticated.

In the optional implementation of a time-limited instance activation window, where a designated activation time window has closed before successful instance activation, the deployment management/control authority will generally discard the instance's associated cryptographic key, thereby preventing any subsequent validation/activation of the same instance (e.g. a distinct copy) and rendering it inoperative. The controlling authority may further optionally flag the target runtime environment as compromised and/or interrupt or redirect network services/applications otherwise intended to be provided through this and subsequent instances.

Likewise, the short lifespan of any particular instance, itself optionally exhibiting security characteristics acquired through effective code obfuscation, can detract potential attacks by virtue of the limited timeframe available for any such attack before a new unique instance must be addressed. That is, unique short-term (ephemeral) machine executable code (e.g. computer-executable application, program, engine, etc.) instances can be serially deployed such that potential hackers are only provided a limited timeframe to attack and attempt to compromise any particular instance before a subsequent instance is deployed as replacement. Accordingly, unless a particular instance can be effectively analyzed and attacked within that timeframe, the hacking process must be restarted for each instance, thereby discouraging further attempts.

As noted above, this approach may be particularly attractive in the deployment of security applications, for instance, operating on various network-accessible resources that may be subject to repeated and persistent attacks. For instance, in the case of security applications such as VPNs, virtualized HSMs, secure communication protocol servers (e.g. TLS or SSL), firewalls or similar network security resources, persistent attack efforts could generally lead to the compromise of any particular instance. However, given the systematic redeployment of unique instances, such attack efforts may be successfully thwarted with every effort to reverse engineer a particular instance failing within the prescribed runtime lifetime of any such particular instance.

With reference to FIG. 1, and in accordance with one embodiment, a secure machine executable code deployment system 10 and method will now be described. The system generally comprises one or more secure repositories 12 in which an application or like source code can be stored and maintained. As will be described below, this repository may include a single or central repository, or again comprise a distributed network of secure repositories from which to effectively store, manage, update, process and/or distribute the source code depending on the application at hand.

In general, given source code 14 (e.g. source code version) will be compiled by a secure compiler 16 to produce a series of unique machine readable code instances 18. These instances 18 may be uniquely compiled, for example, using different code obfuscation techniques or the like, to each present a distinct reverse engineering challenge to potential third-party attackers (e.g. where the reverse engineering of a particular instance would lead to a limited attack opportunity on another instance of the same machine executable application). As will be detailed below, machine executable code instances 18 may be compiled on-demand for deployment, or again stockpiled (e.g. in a securely encrypted form) in a secure repository (not shown).

Once a particular instance is ready for deployment (i.e. at t=T), a deployment engine or appliance 20, which may take the form of and/or include a network security appliance, a hardware security module (HSM), network-attached HSM and/or other like appliances, will deploy the instance via a (secure) network interface to a target runtime environment 22, for instance within a cloud or network-based environment 24. As illustrated in FIG. 1, the bulk of the system 10 in this example is implemented within a secure processing environment, for example within the context of a secure private network environment or again at least in part within the context of, or including a network-interfacing integrated HSM or appliance, for example, as described in U.S. Provisional Application Nos. 62/513,103 and 62/532,138 filed May 31 and Jul. 13, 2017, respectively, the entire contents of which are incorporated herein by reference. Other private or secure public network-interfacing appliances and devices may also be considered without departing from the general scope and nature of the present disclosure. Furthermore, the secure processing environment as shown in FIG. 1 may be governed or controlled by a single controlling entity, who would generally oversee the entire code storage, compilation and deployment process, or again be governed by distinct entities in a distributed or cooperative fashion, for example, where code storage and resource-heavy compilation may be relegated to a first entity, whereas executable instance deployment activities may be relegated to an alternate deployment or controlling entity. In yet other embodiments, the deployment control authority may further control or manage the downstream runtime environment in the delivery of network-interfacing services, for example, or may be outsourced to a third party security service provider who is tasked with the management and control of deployment activities. The person of ordinary skill in the art will readily appreciate that alternative governance and system authority models may also be considered, be it in an integrated, distributed, or other hybrid model, and that, without departing from the general scope and nature of the present disclosure.

As noted above, each instance will be deployed to have a designated lifetime, for instance, defined by a short-term deployment runtime window uniquely or consistently applied to each runtime instance, in FIG. 1 depicted as dt. While a time-based operating window is described and illustrated herein, other operating window may also or alternatively be considered, for example, based on a designated number of runtime operations, transactions, exchanges, sessions or the like. In general, an instance's runtime lifespan may be hardcoded into the instance itself (e.g. at compilation) or again applied by the deployment engine 20 before or during the deployment session (otherwise and interchangeably referred to below as an activation or deployment activation and/or authentication process). Either way, once an instance's designated lifetime has elapsed, its runtime execution will be terminated and a subsequent instance will be deployed (e.g. at time t=T+dt), and subsequently so for the next and every subsequent instance. Clearly, where the deployed application is executed to provide a continuous service or function, e.g. within the context of a secure session protocol or Web service access application, different handoff procedures or bridging procedures may be invoked to provide a seamless or near seamless execution between instances.

Each instance may also benefit from further security measures, for instance involving one or more encryption/decryption procedures such as a white box encryption procedure that embeds or encapsulates each given instance with a white box key or like cryptographic data to further secure its deployment and execution. For example, the deployment engine 20 may require that a given deployed instance call back (26) using a stored network address of the deployment engine and optionally using its embedded or encapsulation key to establish a secure connection, within a preset deployment or activation window to ensure its safe deployment and execution, or otherwise face immediate termination. The delivery of sensitive runtime data may also or alternatively be withheld until the deployment activation process has been securely confirmed, as can other measures be implemented to verify, validate and/or authenticate the target runtime environment before, during or after deployment. In doing so, should an unauthorized third party access a copy of the instance from the runtime environment, they are more than likely to "call back" late, i.e. after the original intended instance, thereby failing to complete their own activation process and ultimately fail to gain authorized access to sensitive runtime data. Likewise, the deployment engine may be configured to accept only a single call back request for a given instance, such that, even if a particular unauthorized copy of a given instance manages to call back during the designated activation window, this "second" call back will be discarded and optionally used to trigger or flag a system security assessment protocol. As will be described in greater detail below, further runtime environment authentication procedures may be completed prior to full operative execution of the deployed instance, for instance, by verifying the runtime environment network address, operating system, hardware resource MAC address, hardware signature or the like.

With reference now to FIGS. 2 to 5, and in accordance with one embodiment, a process for generating and managing unique ephemeral machine executable code instances will now be described. As noted above, while this process may form part of an overall machine executable code deployment runtime process and system, these functions may also otherwise form part of a distinct code storage and/or compilation process and subsystem, for instance, managed and operated by a distinct operating entity.

Figure 2:
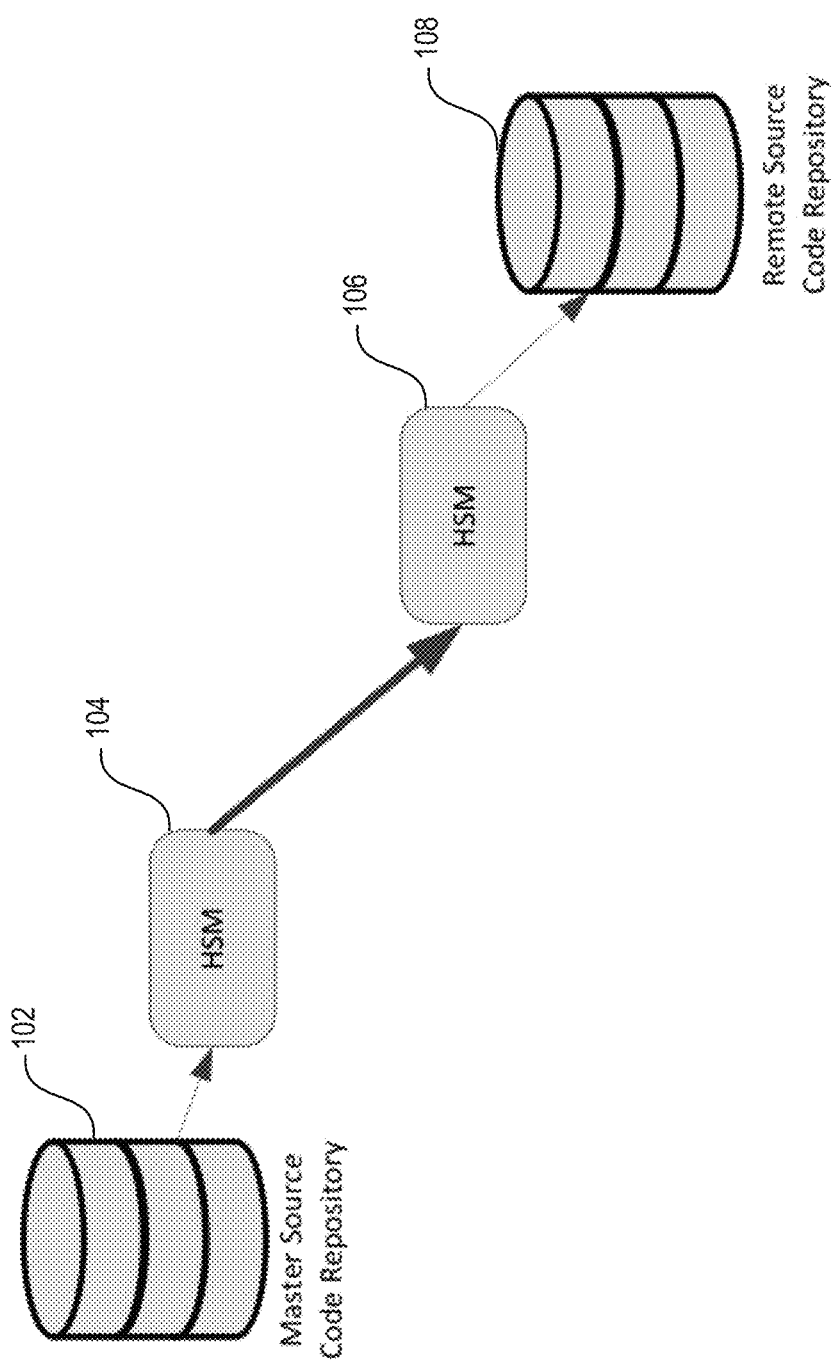
FIG. 2 is a schematic diagram of a distributed source code storage and transfer system, in accordance with one embodiment.

In any event, and with particular reference now to FIG. 2, a master source code repository 102 is shown as located at one network location and used to modify and store a particular application's master source code, for example. A remote source code repository 108 is also provided and used to temporally store copies of the source code for the purposes of compiling the source code into machine language executable applications to be deployed for operation. In modern, cloud-based, digital processing environments, it is often advantageous to separate the physical location of where code development/maintenance/update is being done from the location where the source code is processed into a machine-language executable program, which itself can be particularly resource intensive. To maintain high security standards, a secure method of transmitting the source code from the master repository 102 to the remote repository 108 for downstream compilation and deployment is illustratively provided by a pair of hardware security modules (HSMs) 104, 106 which act to securely gate each network location. For example, in one embodiment, each HSM provides a physical computing device or hardware security appliance that safeguards and manages digital keys for digital system authentication and cryptographic processing. These HSMs may also, in some embodiments, be enclosed within a tamper-proof box, container or shell. Alternative network-attached HSMs may also be considered, as can virtualized HSMs, albeit at a generally lower security level. Ultimately, a secure communication channel can be established over a network between the two HSMs and the application source code can then safely be transferred between the two locations for downstream processing.

As will be appreciated by the skilled artisan, while distinct source code repositories may be advantageous in some embodiments, for example where a master source code is maintained in a secure environment and released to a secure processing environment as needed (e.g. new versions, updates, patches, etc.), other configurations may work directly from a central source code repository, and that, without departing from the general scope and nature of the present disclosure.

Figure 3:
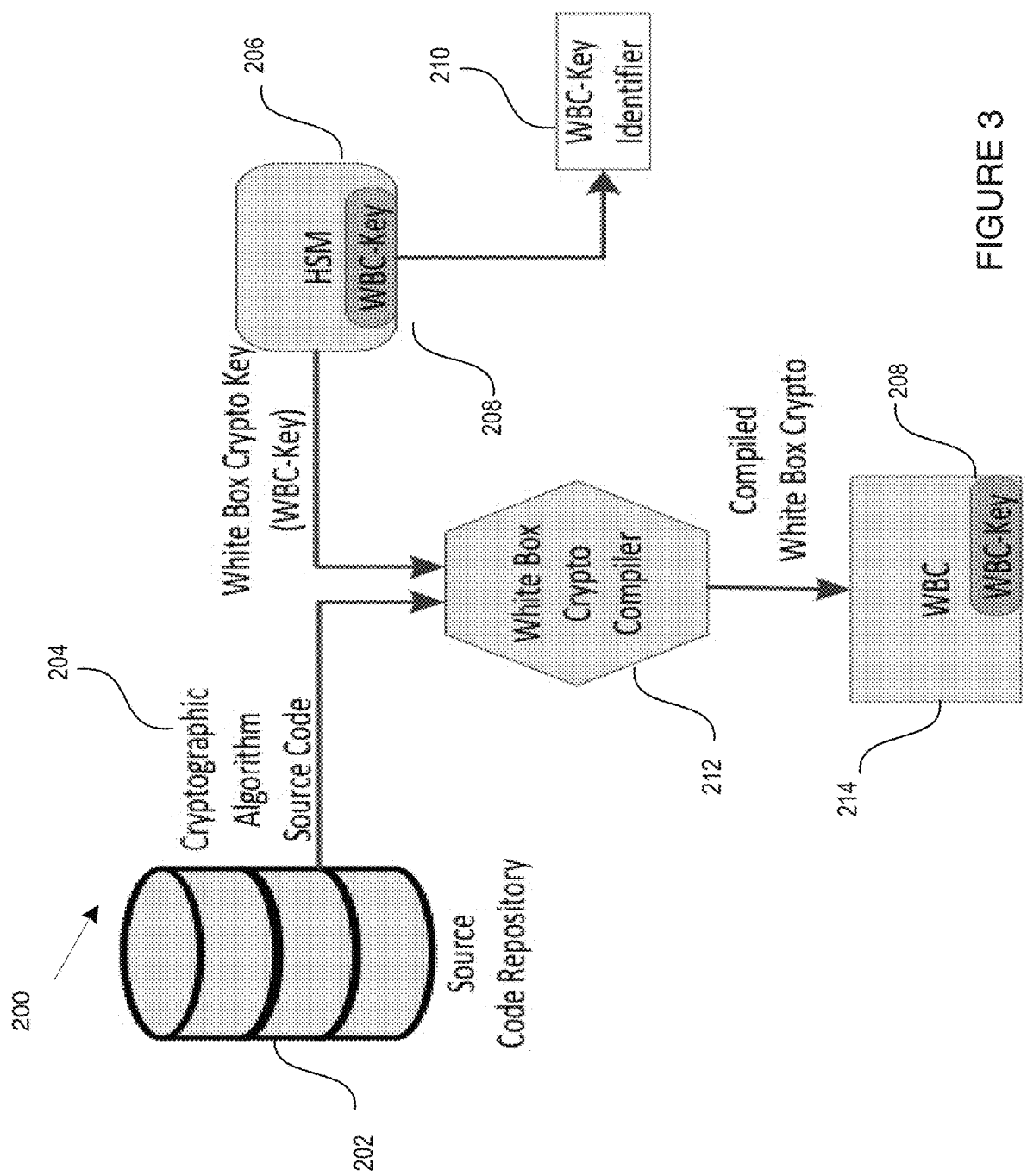
FIG. 3 is a schematic diagram of a white-box compilation process and system, in accordance with one embodiment.
Figure 4:
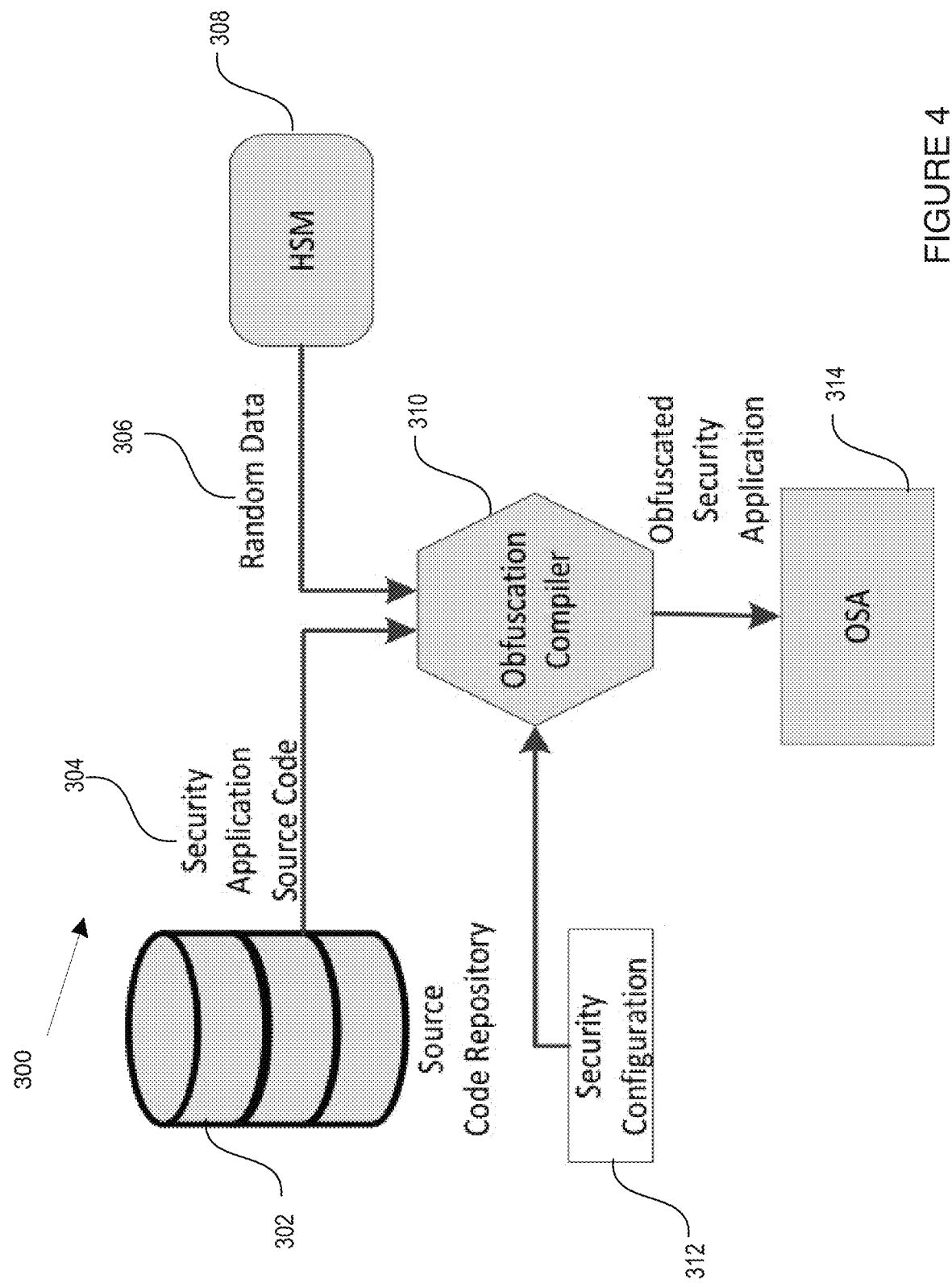
FIG. 4 is a schematic diagram of an code obfuscation process and system, in accordance with one embodiment.
Figure 5:
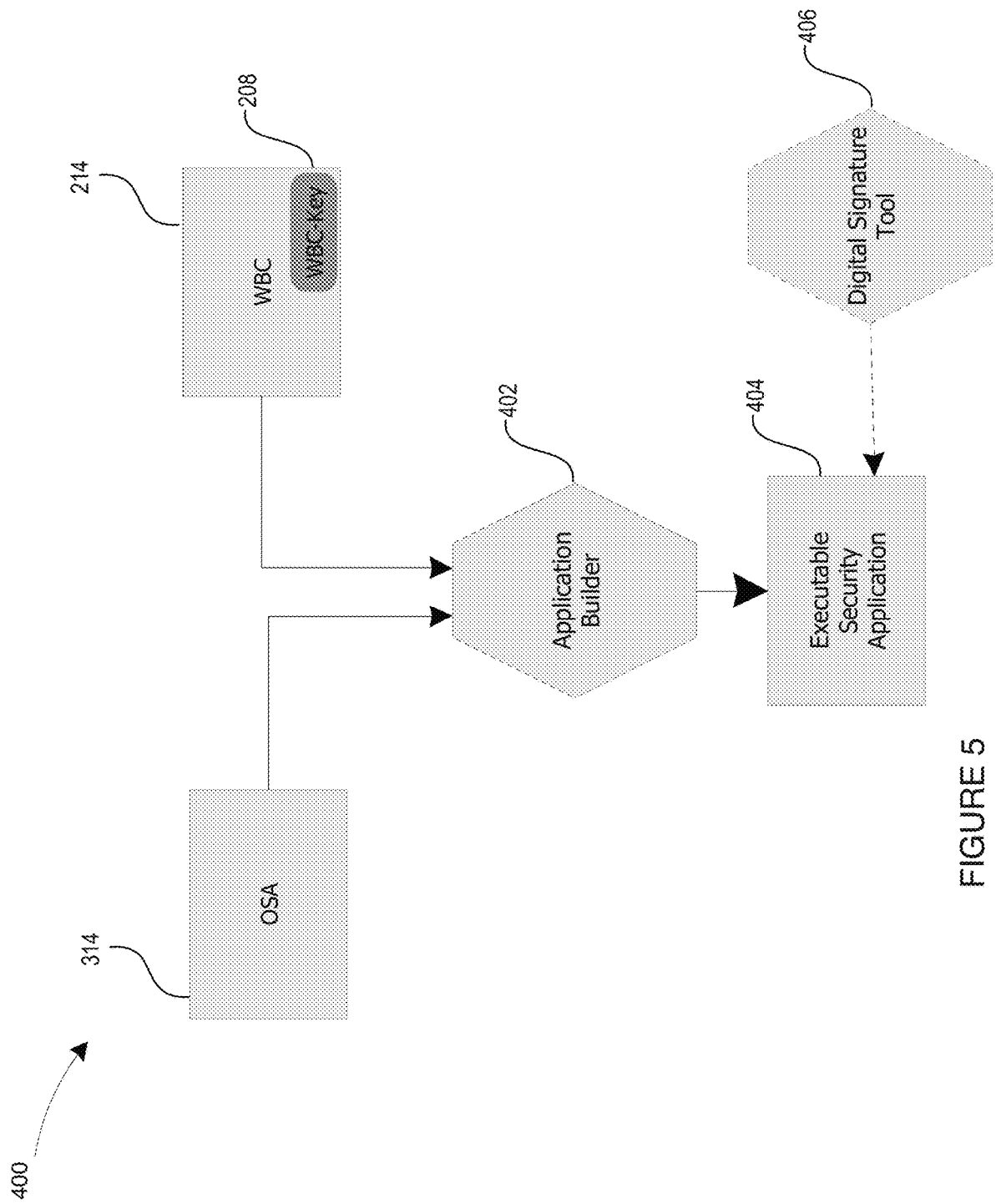
FIG. 5 is a schematic diagram of an executable application building process and system, in accordance with one embodiment, which combines the outputs of the white-box compilation and code obfuscation processes of FIGS. 3 and 4, respectively.

As noted above, in some embodiments, machine executable code security is enhanced through the serial deployment of ephemeral application instances. For instance, the embodiments shown in FIGS. 3 to 5 combine the unique security capabilities of an HSM with unique instantiation of the application to be deployed using white-box cryptography and code obfuscation techniques to create secure ephemeral (time-limited) instances. FIGS. 3 to 5 schematically illustrate the different steps executed to produce a final unique ephemeral instance in the context of a security application to be deployed to a network-interfacing runtime environment. Generally, the illustrated process involves separately producing a unique instance of a white-box encryption library as shown in FIG. 3 to be combined with a unique instance of an application that has been obfuscated according to the process shown in FIG. 4, whereby the two components are integrated into a single, unique machine-executable code instance of the application according to the process of FIG. 5.

As noted above, FIG. 3 shows a schematic description of a cryptographic white-box compilation process 200, in accordance with an exemplary embodiment. A cryptographic algorithm source code 204, describing a computer implementation of a cryptographic algorithm, is stored in a secure source code repository 202. The algorithm used may be any cryptography algorithm suitable to be converted to a white-box implementation. These techniques may include mixing bijections, input/output encoding, external encoding or the like. The repository 202 is operationally linked to a white-box cryptographic compiler 212. The compiler 212 uses as input the source code 204 and a cryptographic key to apply white-box cryptography techniques and produce an instance of a compiled cryptographic library or module 214 having the input key embedded therein. The input key (WBC-Key 208), in this example, is created/provided by a Hardware Security Module (HSM) 206 operatively linked to the compiler 212. The HSM 206 generates the input cryptographic key, referred to herein as a White-Box Cryptographic Key (WBC-key) 208, with an associated WBC-key identifier 210 securely stored for future processing, e.g. during white-box instance identification and executable code activation. For example, the identifier 210 may be later used by a deployment control (activation/authentication) authority to recognize and establish secure communications with a deployed instance during activation, authentication and/or deployment completion, namely by levering cryptographic data corresponding with the integrated WBC-key embedded within the white-box library or module 214 of the deployed machine executable code instance. The skilled artisan will understand that a large range of cryptographic algorithms for authentication/activation using the embedded WBC-key may be used. As a non-limiting example, a proof-of-knowledge identification process or similar with the deployment control authority may be used for activation. The instance of a compiled machine code white-box library or module, considered in this example as a separate binary or as integrated within the final application binary, is hereinafter referred to as the white-box for simplicity.

In addition to the white-box compilation process described above, in some embodiments, a series of code obfuscation techniques may also be employed, as shown for example in FIG. 4. Code obfuscation generally refers to a class of techniques that transform a source program into a target program, such that both programs have the same behavior, but the targeted program is difficult to reverse engineer by any attacker. It will be appreciated by the skilled artisan that a large variety of code obfuscation techniques may be employed, alone or in combination. Their generally common feature is that they change the source code or machine code of a program to make comprehension difficult and/or difficult to reverse engineer while keeping the original functional behavior of the compiled binary the same. Some examples of techniques and algorithms that may be employed include, without limitation, name obfuscation, layout transformations, data obfuscation, random dead code insertions, generation of bogus middle level code, control flow transformations (such as control flow flattening) and/or similar techniques. Some of these techniques may apply changes that are random in nature (that produce a different instance each time the technique is applied on the same source code). Such methods will use input random numbers as seeds to generate the unique random instantiation. As such, every time the same input source code is processed but with different input random data as input, a unique instance of the application is produced. For the purpose of the present document, we will hereby refer to a compiler that applies a series of obfuscation techniques, alone or in combination, to an input source code, with or without the aid of external tools (such as the open-source Loco code obfuscation link-time optimizer or similar) to produce a machine executable code as the Obfuscation Compiler (OC) or simply, obfuscator.

With reference to FIG. 4, the obfuscation system 300 comprises an obfuscation compiler 310 that manages the different obfuscation techniques to be applied. This compiler 310 is operationally linked to a Source code repository 302 (which may, in some embodiments, be the same as the source code repository 202 of FIG. 3, and/or the master 102 or remote 108 source code repositories of FIG. 2), that contains the (security) application source code 304 to be compiled. The OC 310 is further operatively linked to HSM 308, which feeds random input data 306 thereto for the purposes of implementing the selected obfuscation techniques. The compiler 310 may also use parameters provided by Security Configuration Module 312 (e.g. instance lifetime, implementation parameters, etc.) to preconfigure certain operational aspects of the compiled application instance. Ultimately, the OC 310 compiles the input Security Application Source Code 304 with the input Random data and security configurations 312 to generate a unique instance of the Obfuscated Security Application (OSA) 314.

Figure 6:
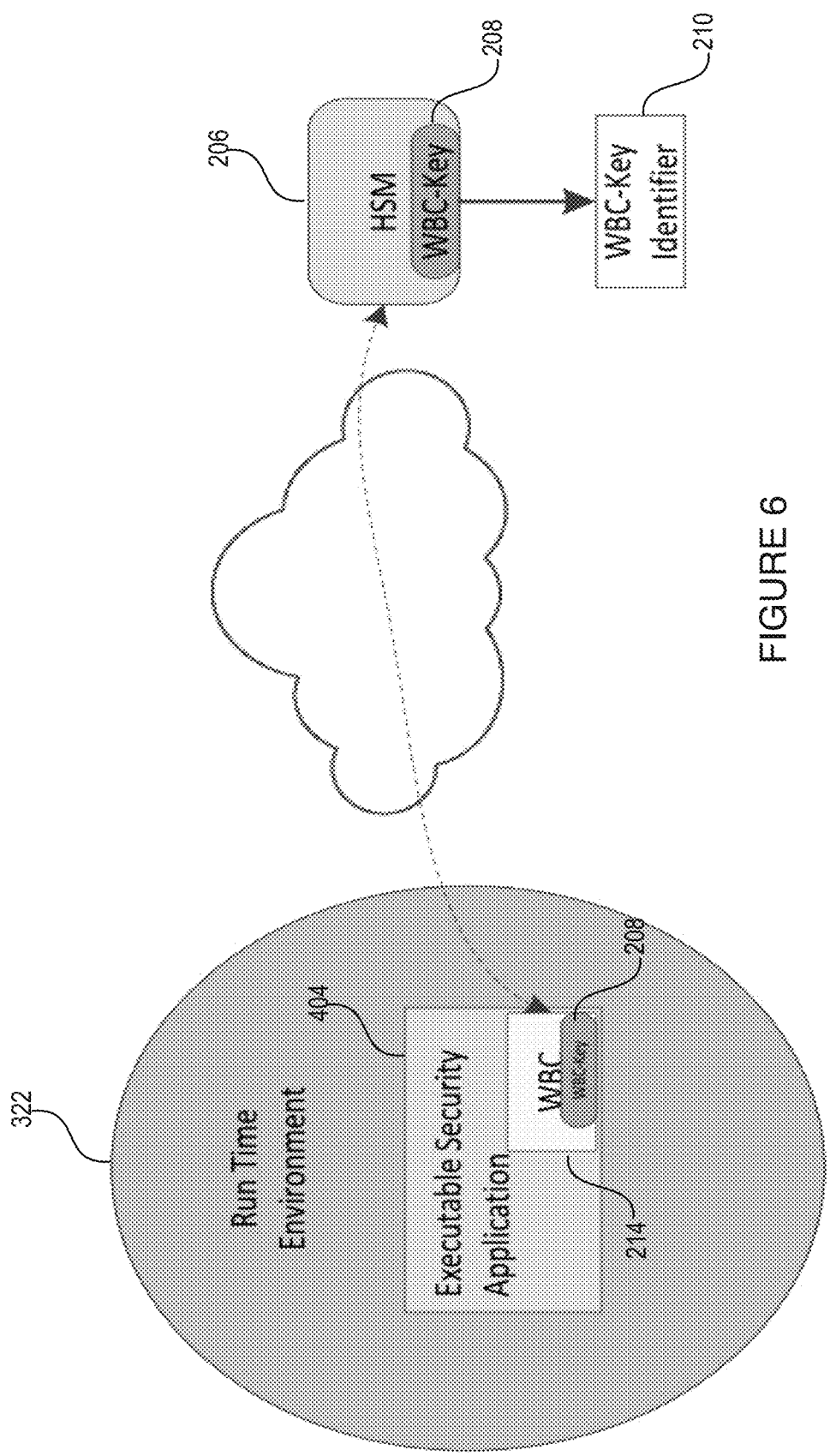
FIG. 6 is a schematic diagram of an executable application activation and/or authentication process, once deployed to a remote runtime environment, in accordance with one embodiment.

With reference to FIG. 5, the final step in the production of the unique executable application instance to be deployed, in accordance with this particular embodiment, involves the integration of the unique OSA instance 314 with the unique instance of white-box 214 (having WBC-key 208 embedded therein), in this embodiment, using an Application Builder 402 or like engine. In doing so, a final and unique instance of a binary Executable Security Application (ESA) 404 is produced. In some embodiments, the Application Builder 402 may functionally encapsulate the ESA instance 404 within a virtual server engine, for example, so to have the application execute within a virtual machine once deployed on and executed within a remote digital processing environment. This virtual machine layer may also provide additional protection such as dynamic code obfuscation techniques, periodic flushing and similar. In some embodiments, a Digital Signature Tool 406 may also be used to further add a digital signature on ESA instance 404. The digital signature applied on ESA instance 404 may either be based on conventional cryptographic digital signature algorithms or on quantum safe algorithms, such as hash-based signature algorithms. In the illustrated embodiments, and with added reference to FIG. 6, at the time of creation or deployment, each instance of the ESA 404 is internally given the network address of its controlling (deploying) authority, that is the deployment engine or like appliance responsible for its ephemeral deployment and capable of verifying, validating and/or authenticating the ESA's runtime environment 322 once deployed. Generally, the controlling authority is implemented within a secure processing environment, as shown in FIG. 1, and maintains the ability, in some embodiments, to recognize and securely communicate with each deployed instance using the WBC-key identifier 210 corresponding with the WBC-key 208 embedded within the deployed instance's white-box 214; in this embodiment, the controlling (deployment) authority encompasses, embodies and/or has operative access to the WBC-equipped HSM 206 of FIG. 3. Accordingly, the controlling authority can thus remotely authenticate and authorize decryption, activation and/or execution of the deployed white-box encrypted ESA instance. In some embodiments, the controlling authority is or includes the HSM that initially generated the WBC-key, though other embodiments may include a distinct HSM or another digital security processing resources that has operative access to the WBC-key and/or related identification resources.

In general, an ESA instance that hasn't been deployed and activated in a distinct digital processing environment is considered to be dormant and can be stored in memory indefinitely. These dormant ESAs may be stockpiled locally within the same secure processing environment that created them, or distributed to a remote digital processing or storage environment for storage or stockpiling. Depending on the nature of the storage resource and environment, these dormant ESAs may be stockpiled in plaintext form or encrypted for greater security.

In contrast, an ESA instance that is deployed on an external digital processing environment (i.e. an IoT device, a networked or network-interfacing computing device or similar) will generally go through an activation and authentication sequence before being able to perform its intended task or function. In some embodiments, the activation sequence must be completed within a relatively short activation window (e.g. seconds) to proceed to full activation, or will otherwise be flagged and terminated as being potentially compromised. For example, in one embodiment, the deployed ESA will initiate a secure communication channel to its designated controlling authority, for instance, via a virtual machine layer as described above and its embedded WBC-key. Only upon completing this exchange within the allotted deployment window will the ESA be authorized to launch and execute its intended task(s). As noted above, if the allotted activation window has expired by the time the ESA instance reaches the deployment authority, the associated WBC-key and its control side identifier will be immediately considered to have been compromised and the ESA instance will be rendered inoperative and will not be authorized to perform its intended function.

The measurement of the elapsed time between deployment of an ESA instance through a network to a remote processing environment, and the moment the ESA instance contacts its controlling authority is made by the controlling authority (e.g. deployment engine 20 of FIG. 1). In some embodiments, the controlling authority may be a HSM embedded with a high precision timing device, such as an onboard atomic clock or similar, though other secure timing resources may also be considered.

In some embodiments, ESAs are stockpiled locally or remotely and deployed therefrom under control of the controlling authority (e.g. deployment engine or appliance). An initial deployment signal or identifier is generated when a given ESA instance is first deployed so that the controlling authority can activate and track a designated deployment window. The deployed ESA instance is programmed to first call back to the controlling authority for activation (using it's WBC-key to establish a secure channel), and, provided the call back is successful within the designated deployment window, the ESA will be authorized to proceed with activation and/or further runtime authentication. If the elapsed time before the ESA calls back exceeds the designated deployment window, the ESA instance will be considered compromised and the associated WBC-key identifier will be discarded, rendering the ESA instance inoperable. The WBC-key identifier may also be discarded if an ESA instance tries to contact its controlling authority but there is no record of it having been deployed, for example, where an unauthorized party gains access to a stockpiled ESA. In some embodiments, the ESA instance may be programmed to self-destruct upon failure to initially contact its controlling authority. By self-destruct, it is meant that the ESA instance would immediately cease to operate and wipe itself and its associated content data completely and irrevocably from the remote digital processing environment. Other activation and verification procedures may also or alternatively be considered without departing from the general scope and nature of the present disclosure.

Before, after or during ESA activation, a runtime authentication process may also be implemented to ensure the ESA has been deployed to a safe and secure runtime environment. During this step, the controlling authority may send one or more runtime hardware identifier requests to the remote digital processing environment, for example, in a random order and/or at random times. Upon reception of a hardware identifier request, the remote digital processing environment has only a limited amount of time to send back the requested information. If the allotted time has expired or the requested hardware identifiers are not considered valid, the remote digital processing environment will be considered compromised and the WBC-key data associated with the ESA instance will be discarded, once again rendering the deployed application inoperable. In some embodiments, the deployed ESA instance may not internally contain any information about the exact nature, number or frequency of these hardware identifiers. These may include but are not limited to CPU type, MAC address, O/S, port configurations, etc., to name a few examples. In some embodiments, the exact nature of the remote run-time environment is known in advance by the controlling authority so to facilitate its authentication.

Inversely, in some embodiments where the ESA is digitally signed prior to deployment, the remote run-time environment may first authenticate the ESA before execution by verifying the validity of the ESA's digital signature. This way, the remote runtime environment 322 may itself trust that the ESA truly originates from the controlling/deploying authority.

In some embodiments, once the ESA instance has been successfully activated and its runtime environment adequately authenticated by the controlling authority, new cryptographic data (e.g. keys) may be exchanged between the devices to re-encrypt the communication channel. It may also receive run-time operational parameters and/or information from the controlling authority so to fully activate the operability of the deployed instance, for example, within the context of network security application or the like (e.g. virtual secure communication server, virtual HSM, cryptographic engine, etc.). The information exchange described above may also be used to deliver to the ESA instance a specific set of security parameters, such as but not limited to: a unique executable application identifier, a time-to-live parameter, a maximum allowed number of operations, a specific performance level or sensitive user data. The time-to-live parameter or the maximum allowed number of operations may be used to define a maximum operation time or uses respectively, after which the ESA instance self-destructs.

Figure 7:
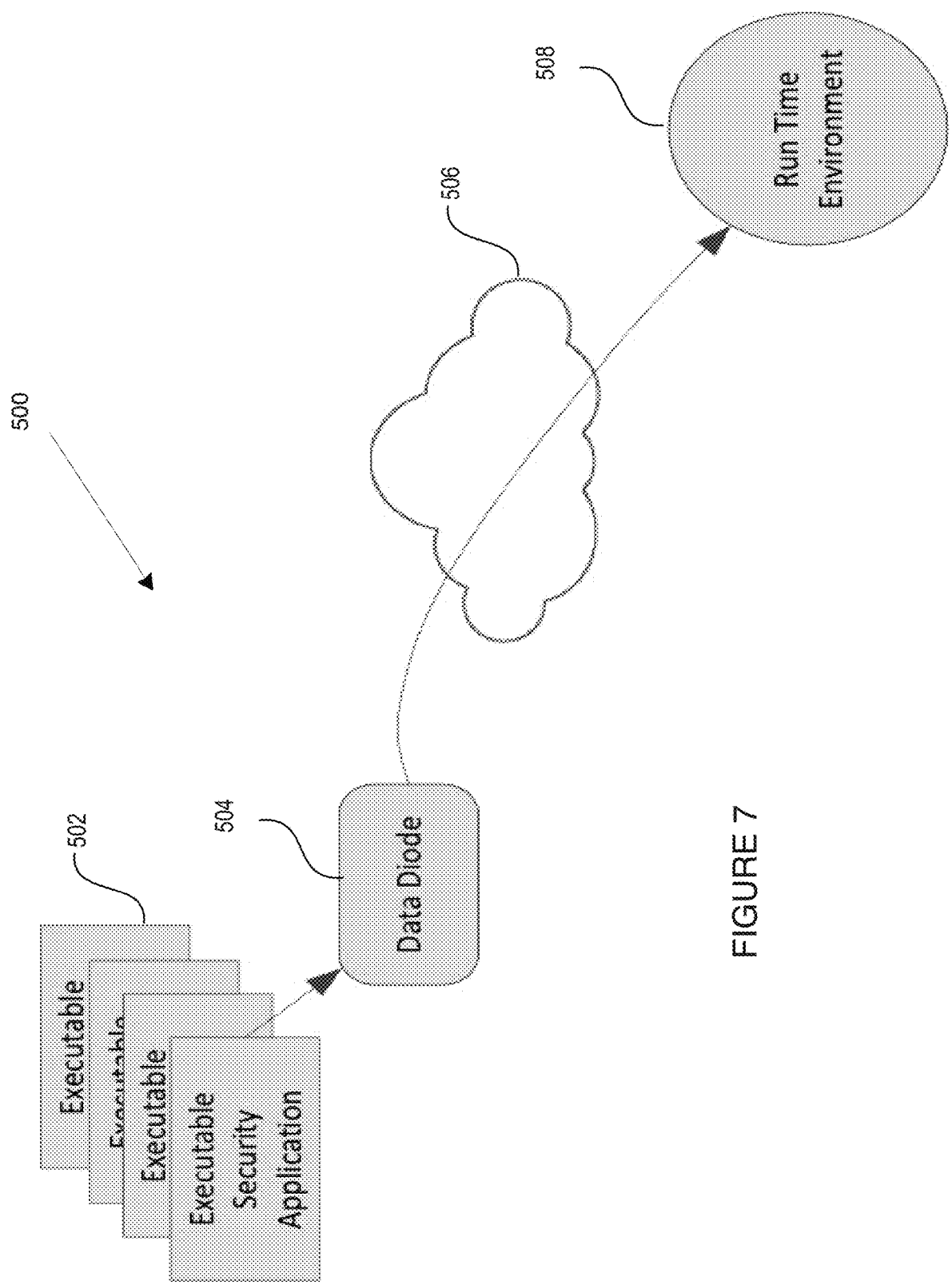
FIG. 7 is a schematic diagram of an executable application deployment system and method, in accordance with one embodiment.

With reference to FIG. 7, and in accordance with one embodiment, a plurality of ESA instances 502 can be produced sequentially by the Application builder 402 and stored at a location within a secure local network. To ensure that the network is protected from any outside intrusions, ESA instances 502 can be deployed via a Data Diode 504, which restricts network traffic to an outwardly unidirectional data flow, thereby preventing intrusions to the ESA stockpile. These ESA instances may be deployed sequentially, as needed, under direction of a local controlling authority (not shown), via a network or cloud based environment 506, to an external run-time (digital processing) environment 508. As described above, once deployed, the ESA instances have a small-time window to implement a secure network-interfacing process, such as establishing a secure external client network connection session, to contact its controlling authority. This controlling authority may be located at another entry point of the same local network or at another network location completely.

Figure 8:
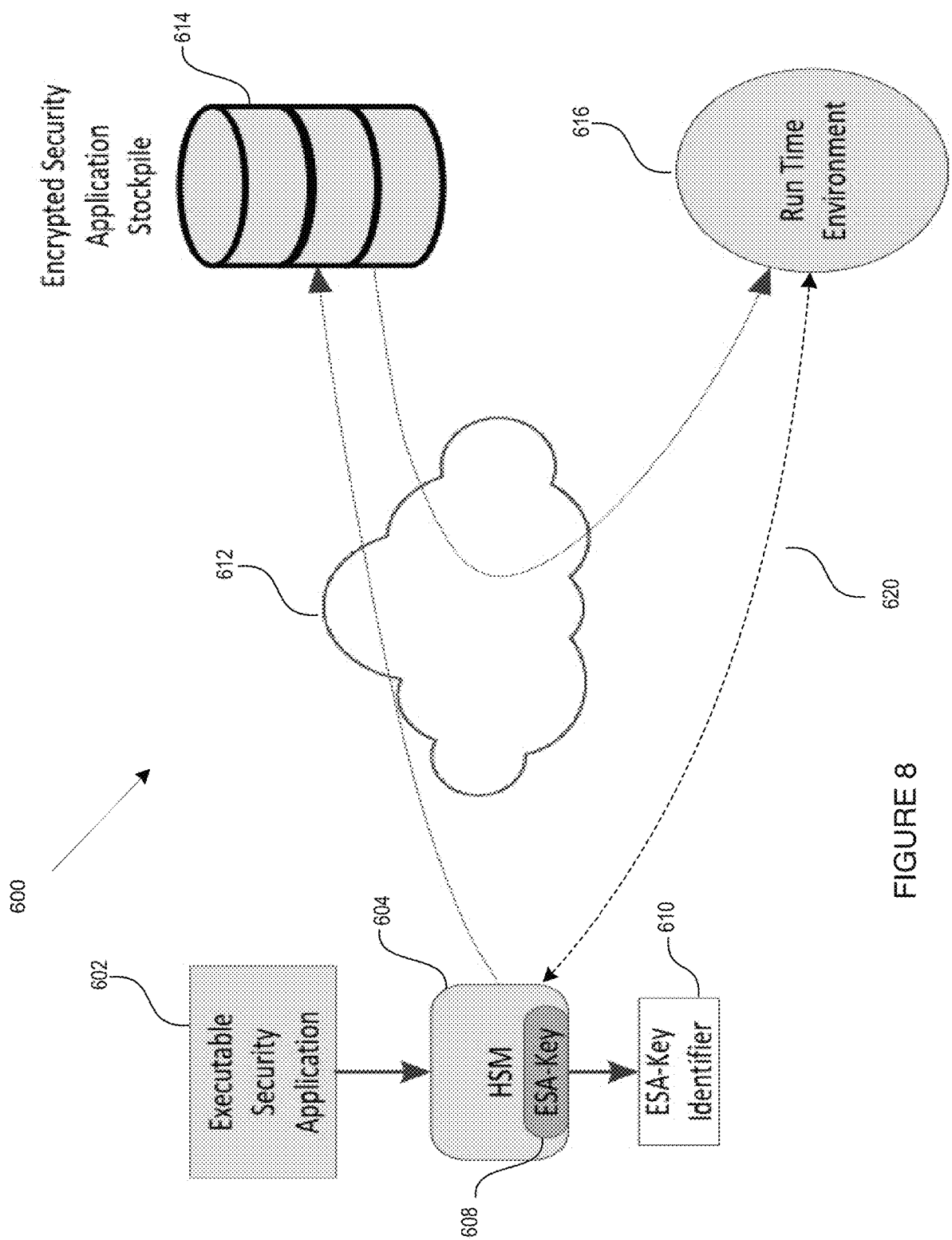
FIG. 8 is a schematic diagram of an executable application deployment system and method, in accordance with another embodiment.

FIG. 8 shows another exemplary embodiment wherein one or more ESA instances, after being created, are further encrypted by HSM 604 with a distinct encryption key (ESA-key) 608 and associated ESA-Key identifier 610. The encrypted ESA instances are then sent to an Encrypted Security Application Stockpile 614 for storage, which may be at another remote network location, until it is deployed on the remote digital processing environment 616. In such cases, instead of initiating the activation time-window from the moment of deployment, the time-window is initiated when the remote run-time environment requests the associated ESA-key from the controlling authority (620). The remote run-time environment uses the ESA-key to decrypt and then run the ESA, which then contacts the controlling authority within the allowed time period for authentication, activation and/or deployment completion using the WBC-key embedded in the ESA. If the allowed time period has elapsed before the ESA instance contacts the controlling authority, then the WBC-key identifier is again considered insecure and discarded.

In some embodiments, a new instance of the ESA may be deployed to the same remote digital processing environment before a previously distributed instance expires. A hand-off procedure may be used to locally transfer content between the two instances after which the second instance takes over and the first instance is destroyed. Upon activation of the second instance, the WBC-key identifier of the first instance is also discarded by the controlling authority. In some embodiments, content may be encrypted and kept in a remote network location. This may be done following a schedule or in real-time, for example. In some embodiments, encrypted content may include state-related content whereby such content may be protected with a secret shared by the two entities, for example.

In another exemplary embodiment, the ESA may be a Virtual Private Network (VPN) Application. In some embodiments, ESA instances would be deployed in two specific locations where both ends of the security tunnel might require short lived and unique security keys. In doing so, for example, each VPN instance could go through their respective activation and authentication processes (e.g. using respectively embedded white-box keys) before gaining access, from the controlling authority, to the secure VPN keys required to establish the VPN between nodes. Other activation, authentication and/or operating sequences may also be considered.

In another exemplary embodiment, the ESA instance may be a short-lived cryptographic machine that can perform cryptographic operations in a digital processing environment, using user key material delivered by the controlling authority for a specific amount of time or for a specific number of operations or some other criterion that might be set based on specific security parameters.

In another exemplary embodiment, the ESA instance may be a short-lived cryptographic module that generates a short-lived key pair that can only be used for a given amount of time. The certification of the public key could be accomplished as part of the secure call-back channel initiated with the controlling authority.

Other possible embodiments may include other types of secure applications such as, but not limited to: next-generation firewalls, anti-virus software, intrusion detection systems or similar.

In some embodiments, a Software Manufacturing Facility (SMF) may be created, in which one or more ESA instances are produced, and from which they can be deployed as needed. In this example, the ESA creation process shown in FIGS. 3 to 6 and the remote ESA stockpile of FIG. 8 may be combined into a single remote network location, hereinafter referred to as the Software Manufacturing Facility (not shown). A HSM, that may or may not be at the same network location, can create the WBC-key and the random data necessary for the production of the ESA instances. In this embodiment, this HSM, called the Master HSM, constitutes the initial controlling authority. This Master HSM, depending on demand, may extend its operating capabilities by deploying short-lived software extensions of itself, herein interchangeably referred to as Short Term Cryptographic Machines (STCM) or virtual HSMs, on remote digital processing environments. The control of individual stockpiled ESA instances, after the activation and authentication steps, may then temporarily be transferred to these STCMs. This way, the computational resource load associated with cryptographic operations may be shared between the Master HSM and the deployed STCMs. In some embodiments, these software STCMs may have similar functionalities as a full HSM, but possibly with limited access to certain sensitive data or repositories (e.g. critical private key or like data). In some embodiments, the STCMs may only have one or more uses before self-destructing. This one or more use may, in some embodiments, be performed only within a previously defined time-window. ESA instances produced by the SMF may contain the network address of one or more STCMs instead of the address of the Master HSM. Remote activation of the deployed ESA instances produced by the SMF would require the ESA instances to contact the associated STCMs. In the case where a large number of ESA instances are being deployed, multiple STCMs may be available to contact for activation. Each STCM may itself contact the Master HSM, which would be operable to validate the remote digital processing environment and transfer the WBC-keys. In such an embodiment, the Master HSM does the initial activation and authentication steps but all other tasks related to encryption and decryption during a single session are done by one or more STCMs.

In one exemplary embodiment, a SMF produces an ESA instance of a SSL application. The WBC-key associated with the White-box embedded within each ESA also acts as the private key used to establish the SSL session. As in previous embodiments, the master HSM creates and stores the WBC-keys used to produce the ESA instances. Upon activation of an ESA instance, the Master HSM now deploys temporary STCMs containing the single-use symmetric session key needed to encrypt a single communication session. These ephemeral keys are transmitted to the SSL application instances and all encryption/decryption during the session thereafter is made by the deployed temporary STCMs.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, no particular order to steps or stages of methods or processes described in this disclosure is intended or implied. In many cases the order of process steps may be varied without changing the purpose, effect, or import of the methods described.

Information as herein shown and described in detail is fully capable of attaining the above-described object of the present disclosure, the presently preferred embodiment of the present disclosure, and is, thus, representative of the subject matter which is broadly contemplated by the present disclosure. The scope of the present disclosure fully encompasses other embodiments which may become apparent to those skilled in the art, and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims. Moreover, no requirement exists for a system or method to address each and every problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail may be made, without departing from the spirit and scope of the present disclosure, as set forth in the appended claims, as may be apparent to those of ordinary skill in the art, are also encompassed by the disclosure.

What is claimed is:

1. A security application deployment method comprising:
compiling source code in a secure internal digital processing environment to produce a plurality of unique ephemeral machine executable code instances representative thereof and executable to implement a security application;
externally deploying a given unique ephemeral machine executable code instance over a communication network to a distinct external digital runtime environment thereby causing execution thereof on said distinct external digital runtime environment for a predetermined runtime window, wherein causing execution comprises causing implementation of said security application therefrom, and further causing automatic termination of said execution after said predetermined runtime window; and
repeating said externally deploying for distinct given unique ephemeral machine executable code instances representative of said source code to a same said distinct external digital runtime environment thereby causing execution thereof on said distinct external digital runtime environment for their respective predetermined runtime windows;
wherein said security application causes establishment of a secure client network session from said distinct external digital runtime environment, wherein said predetermined runtime window comprises a single-use client network session and wherein the method further comprises providing said given unique machine executable code instance operative access to a single-use cryptographic key required to implement said single-use client network session.

2. The method of claim 1, further comprising digitally authenticating said distinct external digital runtime environment and authorizing execution of said given unique machine executable code instance solely upon successful authentication of said distinct external digital runtime environment; wherein said digitally authenticating comprises accessing and authenticating external hardware or external network characteristics associated with said distinct external digital runtime environment.

3. The method of claim 1, further comprising, after said deploying, establishing a designated activation time window and authorizing execution of said given unique machine executable code instance in said distinct external digital runtime environment solely upon receiving an activation request therefrom within said designated activation time window.

4. The method of claim 3, wherein said activation request is securely channeled using a cryptographic key embedded within said given unique machine executable code instance.

5. The method of claim 1, wherein said compiling comprises embedding cryptographic data within said given unique machine executable code instance in a white box encryption process.

6. The method of claim 1, wherein said repeating comprises serially deploying said given distinct unique ephemeral machine executable code instances, wherein a secure process established by said security application is serially transferred from one of said instances to a subsequent one of said instances in providing an operatively seamless implementation of said process.

7. The method of claim 1, further comprising, after said deploying, securely activating said given unique machine executable code instance for execution on said distinct external digital runtime environment, and providing the given machine executable code instance operative access to said single-use cryptographic key solely upon successful activation.

8. The method of claim 1, further comprising, after said deploying, securely activating said given unique machine executable code instance for execution on said distinct external digital runtime environment, and providing the given machine executable code instance operative access to at least one required runtime operational parameter solely upon successful activation.

9. The method of claim 8, wherein said at least one required runtime operational parameter comprises a cryptographic key or a short-lived cryptographic key pair.

10. The method of claim 1, further comprising, after said deploying, securely activating said given unique machine executable code instance for execution on said distinct external digital runtime environment, wherein said securely activating is securely implemented using a cryptographic activation key embedded within said given unique machine executable code instance.

11. The method of claim 1, wherein said security application comprises a short-lived cryptographic application to execute a cryptographic process.

12. The method of claim 1, wherein said compiling is implemented to produce a stockpile of said given unique ephemeral machine executable code instances, and wherein said deploying comprises deploying each given unique ephemeral machine executable code instance on demand from said stockpile.

13. The method of claim 1, wherein said compiling is serially implemented on demand to produce said distinct given unique ephemeral machine executable code instances.

14. A system for deploying a security application to a distinct external digital runtime environment to implement a secure process therefrom, the system comprising:
   a secure network interface to establish a secure network connection to the distinct external digital runtime environment; and
   a secure internal digital processing environment comprising:
      a digital hardware processor;
      a computer-readable memory having a source code securely stored thereon;
      a compiler operable by said digital hardware processor in said secure internal digital processing environment to compile a plurality of given unique ephemeral machine executable code instances, each uniquely representative of said source code and executable as the security application to implement the secure process; and
      a deployment engine operable to deploy each of said given unique ephemeral machine executable code instances over a communication network via said secure network interface to the distinct external digital runtime environment thereby causing execution thereof on said distinct external digital runtime environment for a predetermined runtime window, wherein causing execution comprises causing implementation of the secure process therefrom, and further causing automatic termination of said execution after said predetermined runtime window;
   wherein the system establishes a secure deployment session via said secure network interface with the distinct external digital runtime environment to activate each of said given unique machine executable code instances;
   wherein said secure deployment session is established, at least in part, via a respective unique deployment key embedded by the system within each of said given unique ephemeral machine executable code instances, wherein said respective unique deployment key is embedded via a white-box encryption process.

15. The system of claim 14, wherein said secure deployment session is defined by a designated activation time window in which to complete a machine executable code instance activation process between the system and the distinct external digital runtime environment if execution of each of said given unique machine executable code instances is to be authorized.

16. The system of claim 14, wherein each of said given unique machine executable code instances is uniquely obfuscated.

17. The system of claim 14, further comprising a secure stockpile of said given unique ephemeral machine executable code instances, and wherein said deployment engine is operable to deploy each said given unique ephemeral machine executable code instance therefrom on demand.

18. A security application deployment method comprising:
   compiling source code in a secure internal digital processing environment to produce a plurality of unique ephemeral machine executable code instances representative thereof and executable to implement a security application;
   externally deploying a given unique ephemeral machine executable code instance over a communication network to a distinct external digital runtime environment thereby causing execution thereof on said distinct external digital runtime environment for a predetermined runtime window, wherein causing execution comprises causing implementation of said security application therefrom, and further causing automatic termination of said execution after said predetermined runtime window; and
   repeating said externally deploying for distinct given unique ephemeral machine executable code instances representative of said source code to a same said distinct external digital runtime environment thereby causing execution thereof on said distinct external digital runtime environment for their respective predetermined runtime windows;
   wherein said security application causes establishment of a secure client network session from said distinct external digital runtime environment, wherein said secure client network session comprises a virtual private network (VPN) session, and wherein said compiling and deploying comprises compiling and deploying respective unique machine executable code instances to respective distinct external digital runtime environments to cause implementation of said VPN therebetween.

19. A system for deploying a security application to a distinct external digital runtime environment to implement a secure process therefrom, the system comprising:

a secure network interface to establish a secure network connection to the distinct external digital runtime environment; and
a secure internal digital processing environment comprising:
   a digital hardware processor;
   a computer-readable memory having a source code securely stored thereon;
   a compiler operable by said digital hardware processor in said secure internal digital processing environment to compile a plurality of given unique ephemeral machine executable code instances, each uniquely representative of said source code and executable as the security application to implement the secure process; and
   a deployment engine operable to deploy each of said given unique ephemeral machine executable code instances over a communication network via said secure network interface to the distinct external digital runtime environment thereby causing execution thereof on said distinct external digital runtime environment for a predetermined runtime window, wherein causing execution comprises causing implementation of the secure process therefrom, and further causing automatic termination of said execution after said predetermined runtime window;
wherein said secure process comprises establishing a virtual private network (VPN) session, and wherein the system deploys respective unique machine executable code instances to respective distinct external digital runtime environments to cause implementation of said VPN therebetween.

20. A system for deploying a security application to a distinct external digital runtime environment to implement a secure process therefrom, the system comprising:
   a secure network interface to establish a secure network connection to the distinct external digital runtime environment; and
   a secure internal digital processing environment comprising:
      a digital hardware processor;
      a computer-readable memory having a source code securely stored thereon;
      a compiler operable by said digital hardware processor in said secure internal digital processing environment to compile a plurality of given unique ephemeral machine executable code instances, each uniquely representative of said source code and executable as the security application to implement the secure process; and
      a deployment engine operable to deploy each of said given unique ephemeral machine executable code instances over a communication network via said secure network interface to the distinct external digital runtime environment thereby causing execution thereof on said distinct external digital runtime environment for a predetermined runtime window, wherein causing execution comprises causing implementation of the secure process therefrom, and further causing automatic termination of said execution after said predetermined runtime window;
   wherein said secure process comprises establishing a secure external client network session, and wherein each of said given unique machine executable code instances is deployed to cause implementation of a respective ephemeral virtual server engine to establish a respective said secure external client network session.

21. The system of claim 20, wherein said ephemeral virtual server engine defines a virtualized TLS or SSL server.

22. A system for deploying a security application to a distinct external digital runtime environment to implement a secure process therefrom, the system comprising:
   a secure network interface to establish a secure network connection to the distinct external digital runtime environment; and
   a secure internal digital processing environment comprising:
      a digital hardware processor;
      a computer-readable memory having a source code securely stored thereon;
      a compiler operable by said digital hardware processor in said secure internal digital processing environment to compile a plurality of given unique ephemeral machine executable code instances, each uniquely representative of said source code and executable as the security application to implement the secure process; and
      a deployment engine operable to deploy each of said given unique ephemeral machine executable code instances over a communication network via said secure network interface to the distinct external digital runtime environment thereby causing execution thereof on said distinct external digital runtime environment for a predetermined runtime window, wherein causing execution comprises causing implementation of the secure process therefrom, and further causing automatic termination of said execution after said predetermined runtime window;
   wherein said predetermined runtime window comprises a single-use client network session and wherein the system provides each of said given unique machine executable code instances operative access to a single-use cryptographic key required to implement said single-use client network session.

23. The system of claim 22, wherein the system establishes a secure deployment session via said secure network interface with the distinct digital runtime environment to activate each of said given unique machine executable code instances and provide operative access to said single-use cryptographic key thereto as a result thereof.

24. A system for deploying a security application to a distinct external digital runtime environment to implement a secure process therefrom, the system comprising:
   a secure network interface to establish a secure network connection to the distinct external digital runtime environment; and
   a secure internal digital processing environment comprising:
      a digital hardware processor;
      a computer-readable memory having a source code securely stored thereon;
      a compiler operable by said digital hardware processor in said secure internal digital processing environment to compile a plurality of given unique ephemeral machine executable code instances, each uniquely representative of said source code and executable as the security application to implement the secure process; and
      a deployment engine operable to deploy each of said given unique ephemeral machine executable code instances over a communication network via said secure network interface to the distinct external digital runtime environment thereby causing execution thereof on said distinct external digital runtime environment for a predetermined runtime window, wherein causing execution comprises causing implementation of the secure process therefrom, and further causing automatic termination of said execution after said predetermined runtime window;

wherein the system is a cloud-based system comprising a plurality of distributed digital processing resources, wherein the distinct external digital runtime environment is defined by one of said distributed digital processing resources, wherein said secure internal digital processing environment comprises a central digital processing environment, and wherein said secure network interface interfaces with each of said distributed digital processing resources.

* * * * *

UNITED STATES PATENT AND TRADEMARK OFFICE
CERTIFICATE OF CORRECTION

PATENT NO. : 11,204,748 B2
APPLICATION NO. : 16/875828
DATED : December 21, 2021
INVENTOR(S) : Bruno Couillard et al.

Page 1 of 1

It is certified that error appears in the above-identified patent and that said Letters Patent is hereby corrected as shown below:

On the Title Page

Item (73) Assignee, delete "Ciypto4A Technologies Inc., Gatineau (CA) and insert --Crypto4A Technologies Inc., Gatineau (CA)--.

Signed and Sealed this
Sixteenth Day of July, 2024

*Katherine Kelly Vidal*

Katherine Kelly Vidal
*Director of the United States Patent and Trademark Office*